United States Patent [19]

Ohta et al.

[11] 4,436,800
[45] Mar. 13, 1984

[54] MULTILAYER ELECTROPHOTOGRAPHIC ELEMENT CONTAINING A TRISAZO CHARGE CARRIER GENERATING SUBSTANCE AND A HYDRAZONE CHARGE CARRIER TRANSFER SUBSTANCE

[75] Inventors: Masafumi Ohta, Susono; Kiyoshi Sakai, Numazu, both of Japan

[73] Assignee: Ricoh Co., Ltd., Tokyo, Japan

[21] Appl. No.: 379,686

[22] Filed: May 19, 1982

[30] Foreign Application Priority Data

| May 28, 1981 | [JP] | Japan | 56-80152 |
| May 28, 1981 | [JP] | Japan | 56-80153 |
| May 28, 1981 | [JP] | Japan | 56-80154 |
| May 28, 1981 | [JP] | Japan | 56-80155 |
| May 28, 1981 | [JP] | Japan | 56-80162 |
| May 28, 1981 | [JP] | Japan | 56-80163 |
| May 28, 1981 | [JP] | Japan | 56-80164 |
| May 28, 1981 | [JP] | Japan | 56-80165 |
| May 29, 1981 | [JP] | Japan | 56-82235 |
| May 29, 1981 | [JP] | Japan | 56-82236 |
| May 29, 1981 | [JP] | Japan | 56-82237 |
| May 29, 1981 | [JP] | Japan | 56-82238 |
| Jun. 10, 1981 | [JP] | Japan | 56-88103 |
| Jun. 10, 1981 | [JP] | Japan | 56-88104 |
| Jun. 10, 1981 | [JP] | Japan | 56-88105 |
| Jun. 10, 1981 | [JP] | Japan | 56-88106 |
| Jun. 10, 1981 | [JP] | Japan | 56-88112 |
| Jun. 10, 1981 | [JP] | Japan | 56-88113 |
| Jun. 12, 1981 | [JP] | Japan | 56-90612 |
| Jun. 12, 1981 | [JP] | Japan | 56-90613 |
| Jun. 12, 1981 | [JP] | Japan | 56-90614 |
| Jan. 6, 1982 | [JP] | Japan | 57-475 |
| Jan. 18, 1982 | [JP] | Japan | 57-5683 |
| Jan. 18, 1982 | [JP] | Japan | 57-5684 |
| Jan. 18, 1982 | [JP] | Japan | 57-5688 |

[51] Int. Cl.³ .................................................. G03G 5/06
[52] U.S. Cl. ........................................ 430/59; 430/73; 430/75; 430/76
[58] Field of Search ............ 430/57, 58, 72, 73, 430/76, 79, 75

[56] References Cited

U.S. PATENT DOCUMENTS

| 4,279,981 | 7/1981 | Ohta et al. | 430/73 |
| 4,338,388 | 7/1982 | Sakai et al. | 430/58 |
| 4,343,882 | 8/1982 | Hashimoto | 430/76 |

*Primary Examiner*—John E. Kittle
*Assistant Examiner*—John L. Goodrow
*Attorney, Agent, or Firm*—Flynn, Thiel, Boutell & Tanis

[57] ABSTRACT

An electrophotographic element comprising an electrically conductive substrate, a charge carrier generating layer and a charge transfer layer superimposed on said substrate, wherein said charge carrier generating layer contains a trisazo compound having the general formula (I):

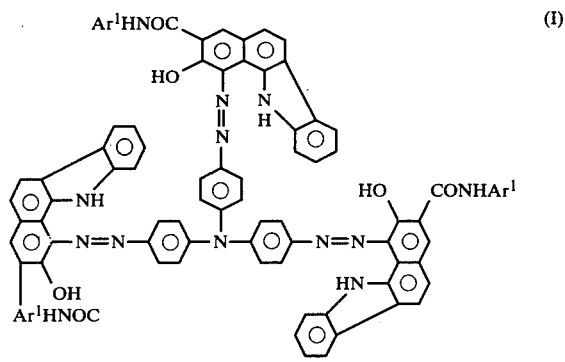

(wherein, $Ar^1$ represents a substituted or unsubstituted phenyl radical and said charge transfer layer contains a hydrazone compound having the general formula (II), (III), (IV), or (V):

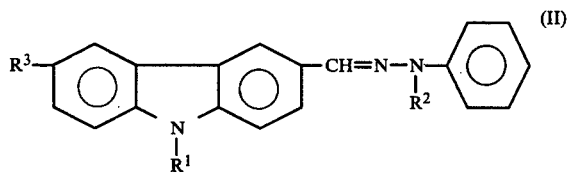

(II)

(wherein, $R^1$ represents a methyl group, an ethyl group, a 2-hydroxyethyl group or a 2-chloroethyl group, $R^2$ represents a methyl group, an ethyl group, a benzyl group or a phenyl group, and $R^3$ represents hydrogen, chlorine, an alkyl group having 1 to 4 carbon atoms, an alkoxyl group having 1 to 4 carbon atoms, a dialkylamino group or a nitro group.),

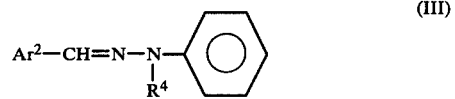

(III)

(wherein, $Ar^2$ represents a naphthalene ring, an anthracene ring, a styryl group and their substituents, or a pyridine ring, a furan ring or a thiophene ring, and $R^4$ represents an alkyl group or a benzyl group.),

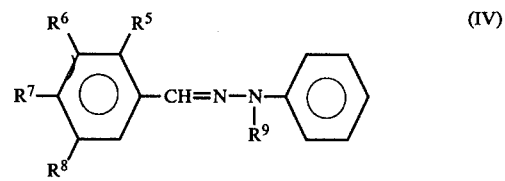

(IV)

(wherein, $R^5$, $R^6$, $R^7$ and $R^8$ each represents hydrogen, an alkyl group having 1 to 3 carbon atoms, an alkoxyl group having 1 to 3 carbon atoms, a dialkyl group or a dibenzylamino group, and $R^9$ represents an alkyl group or a benzyl group.),

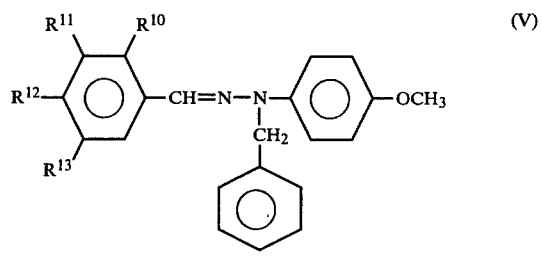

(V)

(wherein, $R^{10}$, $R^{11}$, $R^{12}$ and $R^{13}$ each represents hydrogen, an alkyl group having 1 to 3 carbon atoms, an alkoxyl group having 1 to 3 carbon atoms, a substituted or non-substituted dialkylamino group, a dibenzylamino group or a halogen atom.), and a binder.

16 Claims, 1 Drawing Figure

MULTILAYER ELECTROPHOTOGRAPHIC ELEMENT CONTAINING A TRISAZO CHARGE CARRIER GENERATING SUBSTANCE AND A HYDRAZONE CHARGE CARRIER TRANSFER SUBSTANCE

BACKGROUND OF THE INVENTION (1) Field of the Invention

The present invention relates to an electrophotographic element, in particular relates to an electrophotographic element comprising a layer (which is called a charge carrier generating layer hereinafter) containing a substance capable of generating charge carriers when exposed to light radiation (which is called a charge carrier generating substance hereinafter) and a layer (which is called a charge transfer layer hereinafter) containing a substance capable of accepting the charge carriers generated by said charge carrier generating layer and transferring them (which is called a charge transfer substance hereinafter).

(2) Description of the Prior Art

As typical conventional electrophotographic elements there can be enumerated inorganic and organic ones, the former including those prepared by using selenium or its alloys or dispersing color-sensitized zinc oxides in binder resins, the latter including those prepared by using charge transfer complexes composed of 2,4,7-trinitro-9-fluorenone (which is called TNF hereinafter) and poly-N-vinylcarbazole (which is called PVK hereinafter). However, the fact is that these elements involve various advantages as well as various disadvantages. For instance, now widely used selenium elements are defective in that production cost is high due to complicated manufacturing conditions, it is hard to process them into belts due to lack of flexibility, and they must be handled carefully due to high sensitivity to heat or mechanical impact. On the other hand, zinc oxide elements are advantageous in that their production cost is low because they can be manufactured by coating inexpensive zinc oxides onto substrates, but said zinc oxide elements are generally low in sensitivity, lack surface smoothness and are inferior in mechanical characteristics such as hardness, tensile strength and friction resistance. Accordingly, those zinc oxide elements still involve problems of durability and so forth that need to be solved in order that they may be used as elements for use in plain paper copying machines which are generally run repeatedly. In addition, elements using charge transfer complexes composed of TNF and PVK are unsuitable to be used as elements for use in high speed copying machines because of low sensitivity.

Recently, an extensive study has been carried out to eliminate drawbacks inherent in these elements, in particular various kinds of organic elements have been proposed. Among them, public attention has been attracted to such laminate type elements, prepared by forming an organic dye thin film (charge carrier generating layer) on an electrically conductive substrate and further forming thereon a layer consisting essentially of a charge transfer substance (charge transfer layer), as elements for use in plain paper copying machines because they are generally of high sensitivity and stable chargeability compared with conventional organic type elements. Some of them are put to practical use.

The electrostatic latent image forming mechanism using this kind of laminate type element is considered to consist in that in case the element is charged and then exposed to light radiation, the light penetrates through the transparent charge transfer layer and is absorbed by the charge carrier generating substance incorporated in the charge carrier generating layer, the charge carrier generating substance, upon absorbing the light, generates charge carriers, these charge carriers are injected in the charge transfer layer and travel within the charge transfer layer along the electric field caused by the electric charge, and thus the electric charge on the element surface is neutralized, whereby an electrostatic latent image is formed. Accordingly, the charge carrier generating substance used in this kind of element is required to be one capable of generating charge carriers with high efficiency when exposed to light radiation for the image forming purpose.

On the other hand, the charge transfer substance is required to be transparent to the light used and capable of maintaining a desired charged potential and transferring the charge carriers generated by the charge carrier generating substance rapidly when exposed to light radiation.

As the conventional laminate type elements of this kind there can be enumerated (1) the element using the charge carrier generating layer incorporating a perylene derivative therein and the charge transfer layer incorporating an oxadiazole derivative therein (which see U.S. Pat. No. 3,871,882), (2) the element using the charge carrier generating layer formed by coating Chlorodiane Blue with an organic amine as the solvent and the charge transfer layer incorporating a pyrazoline derivative therein (which see Japanese Laid Open Patent Application 55643/1977 and Japanese Laid Open Patent Application 72231/1977), (3) the element using the charge carrier generating layer formed by coating a dispersion obtained by dispersing a triphenylamine type trisazo pigment (which see Japanese Laid Open Patent Application 132347/1978) for instance in a dispersion medium such, for instance, as tetrahydrofuran or the like and the charge transfer layer incorporating 2,5-bis(4-diethylaminophenyl)-1,3,4-oxadiazole or TNF, and the like.

However, the fact is that the conventional laminate type elements of this kind possess a number of advantages and simultaneously various drawbacks.

For instance, the element using perylene and oxadiazole derivatives as shown in the preceding (1) does not cause any problem when put to practical use, but is inferior in sensitivity when used in high speed copying machines. And, this element is also defective in that it is not used suitably in color copying machines because the charge carrier generating substance on which the spectral sensitivity depends, namely the perylene derivative does not have absorption over the whole visible area.

The element using Chlorodiane Blue and a pyrazoline derivative as shown in the preceding (2) is noted, from our inventors' experiment, to have a relatively good sensitivity but involve many defects that there is necessity of using the organic amine being generally difficult to handle (for instance, ethylenediamine) during its preparation and the like.

The element shown in the preceding (3), which has been proposed by our inventors, is advantageous in that the charge carrier generating layer can be formed easily by coating the substrate with a pigment dispersion obtained by dispersing fine pigment particles in the organic solvent (a binder resin may be added thereto as occasion demands), but is defective in that this element is somewhat inferior in sensitivity and so can not suitably used in high speed copying machines. Of late years, the demand for elements for use in laser printers has been growing, and the development of elements capable of exhibiting high sensitivity especially to the wavelength region of semi-conductor laser has been demanded strongly. However, the fact is that the above mentioned elements are extremely low-sensitive to these semi-conductor lasers and so can not be put to practical use.

SUMMARY OF THE INVENTION

In the light of the above mentioned facts, our inventors have earnestly carried out a series of studies on a variety of charge carrier generating substances and charge transfer substances for the purpose of developing a laminate type element that is highly sensitive, exhibits a substantially flat (uniform) sensitivity over the total visible region and the wavelength range of semi-conductor laser and is easy to produce and have discovered that the characteristics of trisazo pigment, i.e. the charge carrier generating substance, having the structure as shown in the general formula (I) vary widely depending on the kind or position of a substituent group attached to the terminal CONH—, the trisazo pigment having the substituent group represented by the general formula (I) exhibits especially superior characteristics and the characteristics of the element widely vary depending on the combinations of the charge carrier generating substances and charge transfer substances. The above object has been attained by providing an element capable of exhibiting superior sensitive characteristics on the basis of thus discovered specific combinations.

It is one object of the present invention to provide a charge carrier generating substance having an exceedingly superior charge carrier generating capacity, and another object of the present invention is to provide a charge transfer substance which exhibits a superior capacity when used concurrently with said charge carrier generating substance. Still another object of the present invention is to provide an element comprising laminating a layer containing said charge carrier generating substance and a layer containing said charge transfer substance, characterized in that the characteristics of said element are not affected at all even when subjected repeatedly to the copying process wherein charge, exposure, development and latent image-erasing are repeated in the manner of impressing a sufficient charged potential upon the element in the dark and dissipating the surface potential rapidly by exposure.

That is, the present invention relates to an electrophotographic element comprising an electrically conductive substrate, a charge carrier generating layer and a charge transfer layer superimposed on said substrate, wherein said charge carrier generating layer contains a trisazo compound having the general formula (I):

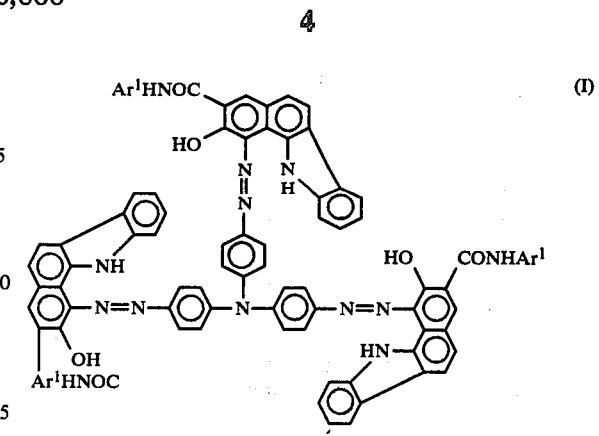

(wherein, $Ar^1$ represents

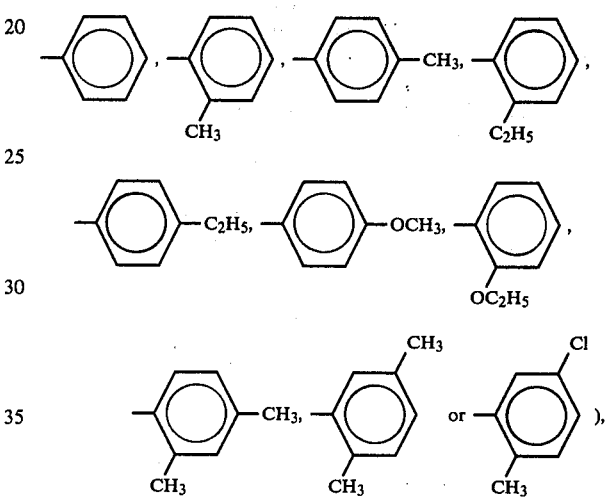

and said charge transfer layer contains a hydrazone compound having the general formula (II), (III), (IV) or (V):

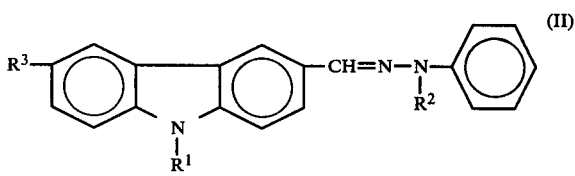

(wherein, $R^1$ represents an methyl group, an ethyl group, a 2-hydroxyethyl group or a 2-chloroethyl group, $R^2$ represents a methyl group, an ethyl group, a benzyl group or a phenyl group, and $R^3$ represents hydrogen, chlorine, bromine, an alkyl group having 1 to 4 carbon atoms, an alkoxy group having 1 to 4 carbon atoms, a dialkylamino group whose alkyl group preferably has 1 to 4 carbon atoms or a nitro group).

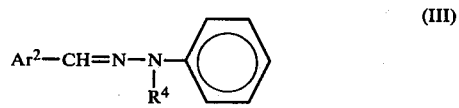

(wherein, $Ar^2$ represents a naphthalene ring, an anthracene ring, a styryl group and their substituents, or a pyridine ring, a furan ring and a thiophene ring, and $R^4$ represents an alkyl group such as a methyl group, an ethyl group or the like or a benzyl group.)

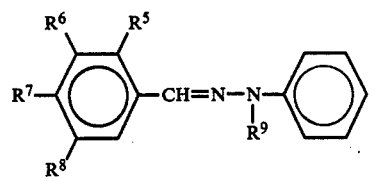

(wherein, $R^5$, $R^6$, $R^7$ and $R^8$ each represents hydrogen, an alkyl group having 1 to 3 carbon atoms, an alkoxy group having 1 to 3 carbon atoms, a dialkylamino group or a dibenzylamino group, and $R^9$ represents an alkyl group such as a methyl group, an ethyl group or the like or a benzyl group.)

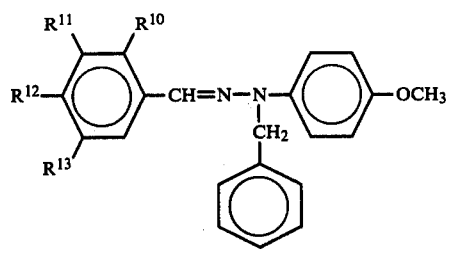

(wherein, $R^{10}$, $R^{11}$, $R^{12}$ and $R^{13}$ each represents hydrogen, an alkyl group having 1 to 3 carbon atoms, an alkoxyl group having 1 to 3 carbon atoms, a substituted or non-substituted dialkylamino group whose alkyl group preferably has 1 to 3 carbon atoms, a dibenzylamino group or a halogen atom.) and a binder.

DETAILED DESCRIPTION OF THE INVENTION

Figure 1:
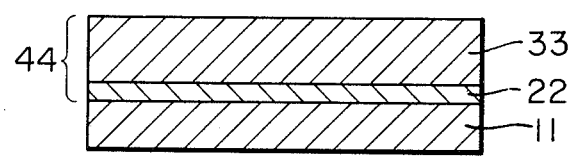
FIG. 1 is a greatly enlarged schematic cross-sectional view of an element embodying the present invention.

The trisazo compound used in the present invention as the charge carrier generating substance includes those as shown in Table 1:

TABLE 1

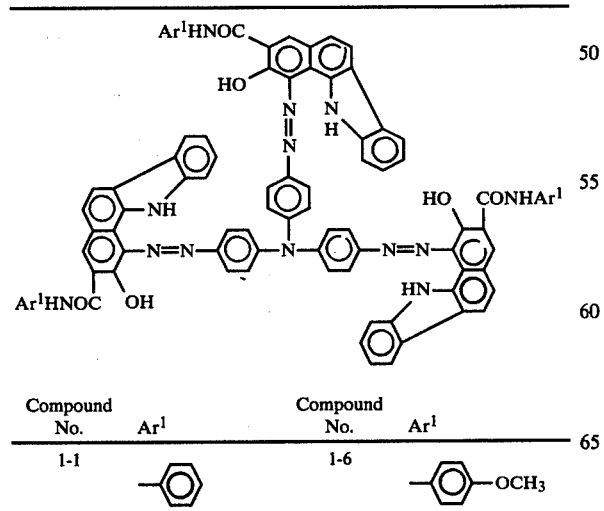

| Compound No. | $Ar^1$ | Compound No. | $Ar^1$ |
|---|---|---|---|
| 1-1 | —⌬ | 1-6 | —⌬—OCH₃ |

TABLE 1-continued

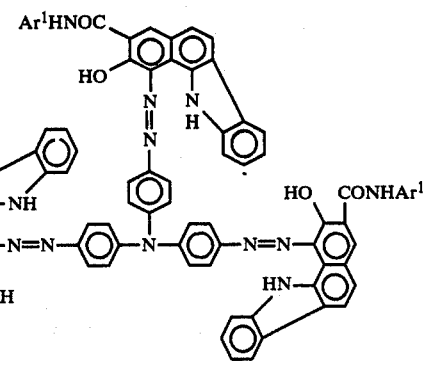

| Compound No. | $Ar^1$ | Compound No. | $Ar^1$ |
|---|---|---|---|
| 1-2 | —⌬ (CH₃) | 1-7 | —⌬ (OC₂H₅) |
| 1-3 | —⌬—CH₃ | 1-8 | —⌬—CH₃ (CH₃) |
| 1-4 | —⌬ (C₂H₅) | 1-9 | —⌬ (CH₃, CH₃) |
| 1-5 | —⌬—C₂H₅ | 1-10 | —⌬ (Cl, CH₃) |

The trisazo compounds used in the present invention can be obtained by diazotizing 4,4′4″-triaminotriphenylamine represented by the formula

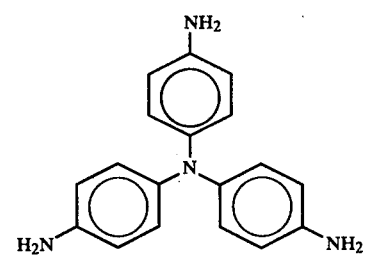

into hexazonium salt represented by the general formula

[VI]

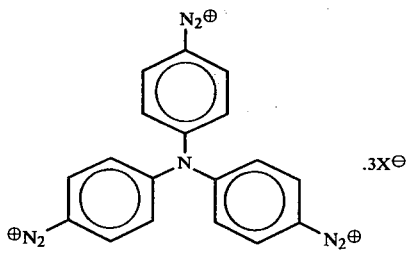

(wherein, X represents an anion functional group.), and coupling the same with 2-hydroxy-3-phenylcarbamoyl-benzo[a]carbazole derivatives represented by the general formula [VII] in the usual manner

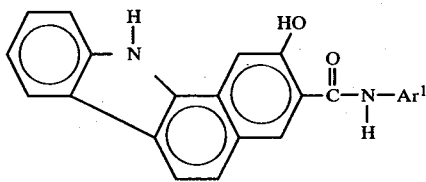

(wherein, Ar$^1$ is the same as defined previously.).

Preparation Example 8.7 g of 4,4',4''-triaminotriphenylamine were added to dilute hydrochloric acid prepared from 150 ml of undiluted hydrochloric acid and 130 ml of water and the resulting mixture was well stirred at room temperature for about 30 minutes. Next, this mixture was cooled to about 0° C., and a solution prepared by dissolving 7.7 g of sodium nitrite in 30 ml of water was dropped in said mixture at a temperature of −3° to 2° C. for about 20 minutes. Thereafter, this mixture was stirred at the same temperature for about 1 hour and a small amount of insoluble matter was filtered out. 60 ml of a 42% aqueous borofluoric acid solution were added to the filtrate and the separated precipitate was filtered out. The precipitate thus filtered out was washed with water and then dried to obtain 15.3 g of hexazoniumtrifluoroborate (yield: 87%) in the form of yellow crystals (decomposition point: about 129° C.).

Next, 1.2 g of the hexazonium salt and 2.8 g of the 2-hydroxy-3-phenylcarbamoylbenzo[a]carbazole obtained as mentioned previously were dissolved in 210 ml of DMF. A solution prepared by dissolving 29 g of sodium acetate in 30 ml of water was dropped in the former solution at room temperature for about 5 minutes. After dropping has been completed, the same was stirred at the same temperature for further 3 hours, and then separated crystals were filtered out.

The obtained coarse crystal cake was dispersed in 300 ml of DMF. This dispersion was stirred at room temperature for 1 hour and then crystals were again filtered out thereof. This operation was further repeated 4 times. Thereafter, the obtained crystals were washed with water and dried to obtain 1.5 g (yield: 50%) of No. 1-4 triasazo compound according to the present invention.

| Black crystal Decomposition point 300° C. or more Elementary analysis value | | |
|---|---|---|
| | Actual value | Calculated value |
| C % | 75.93 | 76.26 |
| H % | 4.58 | 4.75 |
| N % | 12.50 | 12.43 |

Infrared absorption spectrum (KBr tablet method) vc=0 (secondary amide) 1670$^{-1}$ The exactly same procedure as mentioned above was repeated except that

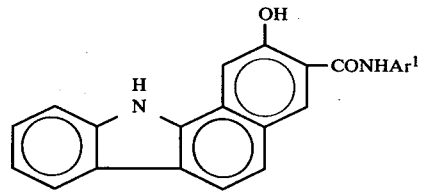

(wherein, Ar$^1$ is as shown in Table 2) was employed in place of the 2-hydroxy-3-(2-ethylphenylcarbamoyl)benzo[a]carbazole to obtain the trisazo compound according to the present invention.

TABLE 2

| | | | | Product | | | |
|---|---|---|---|---|---|---|---|
| | | | | | Elementary analysis (%) | | Vc = 0 (secondary |
| Ar$^1$ | | Compound No. | Property | Decomposition point | | Calculated Value | Actual value | amide) cm$^{-1}$ |
| —⌬ | | 1-1 | Black Crystal | 300° C. or more | C H N | 75.53 3.98 12.85 | 75.69 4.16 13.19 | 1670 |
| —⌬ CH$_3$ | | 1-2 | Black Crystal | 300° C. or more | C H N | 75.68 4.23 12.52 | 75.99 4.46 12.80 | 1670 |
| —⌬—CH$_3$ | | 1-3 | Black Crystal | 300° C. or more | C H N | 75.71 4.26 12.54 | 75.99 4.46 12.80 | 1670 |
| —⌬—C$_2$H$_5$ | | 1-5 | Black Crystal | 300° C. or more | C H N | 76.41 4.48 12.16 | 76.26 4.75 12.43 | 1670 |

TABLE 2-continued

| Ar¹ | Compound No. | Property | Decomposition point | Elementary analysis (%) Calculated Value | | Actual value | $V_{C=O}$ (secondary amide) cm⁻¹ |
|---|---|---|---|---|---|---|---|
| (phenyl with OC₂H₅) | 1-7 | Black Crystal | 300° C. or more | C<br>H<br>N | 73.59<br>4.56<br>11.79 | 73.84<br>4.60<br>12.04 | 1670 |
| (phenyl with CH₃, CH₃) | 1-8 | Black Crystal | 300° C. or more | C<br>H<br>N | 76.41<br>4.46<br>11.93 | 76.26<br>4.75<br>12.43 | 1680 |
| (phenyl with CH₃, CH₃) | 1-9 | Black Crystal | 300° C. or more | C<br>H<br>N | 76.09<br>4.61<br>11.93 | 76.26<br>4.75<br>12.43 | 1680 |
| (phenyl with Cl, CH₃) | 1-10 | Black Crystal | 300° C. or more | C<br>H<br>N | 70.50<br>3.76<br>11.92 | 70.84<br>3.96<br>11.93 | 1680 |
| (phenyl with OCH₃) | 1-6 | Black Crystal | 300° C. or more | C<br>H<br>N | 73.51<br>4.32<br>12.38 | 73.13<br>4.09<br>12.00 | 1670 |

Typical hydrazone compounds used as the charge transfer material in the present invention are as shown in the following Table 3 to Table 6.

TABLE 3

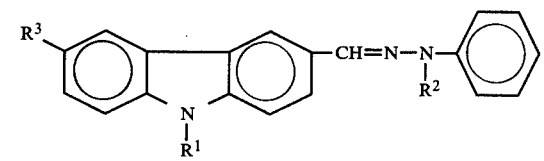

| Compound No. | R¹ | R² | R³ |
|---|---|---|---|
| 2-1 | —CH₃ | —CH₃ | —H |
| 2-2 | —CH₃ | —C₂H₅ | —H |
| 2-3 | —CH₃ | —CH₂—(phenyl) | —H |
| 2-4 | —CH₃ | —(phenyl) | —H |
| 2-5 | —C₂H₅ | —CH₃ | —H |
| 2-6 | —C₂H₅ | —C₂H₅ | —H |
| 2-7 | —C₂H₅ | —CH₂—(phenyl) | —H |
| 2-8 | —C₂H₅ | —(phenyl) | —H |
| 2-9 | —C₂H₄OH | —CH₃ | —H |
| 2-10 | —C₂H₄OH | —C₂H₅ | —H |
| 2-11 | —C₂H₄OH | —CH₂—(phenyl) | —H |
| 2-12 | —C₂H₄OH | —(phenyl) | —H |
| 2-13 | —C₂H₄Cl | —CH₃ | —H |
| 2-14 | —C₂H₄Cl | —C₂H₅ | —H |
| 2-15 | —C₂H₄Cl | —CH₂—(phenyl) | —H |
| 2-16 | —C₂H₄Cl | —(phenyl) | —H |
| 2-17 | —CH₃ | —CH₃ | —Cl |
| 2-18 | —CH₃ | —C₂H₅ | —Br |
| 2-19 | —CH₃ | —C₂H₅ | —OCH₃ |
| 2-20 | —CH₃ | —C₂H₅ | —NO₂ |
| 2-21 | —CH₃ | —CH₂—(phenyl) | —Cl |
| 2-22 | —CH₃ | —CH₂—(phenyl) | —N(CH₃)₂ |

TABLE 3-continued

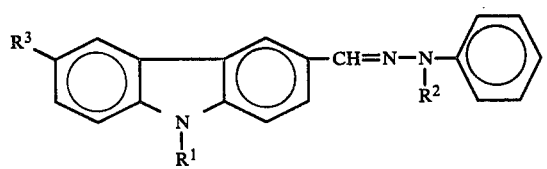

| Compound No. | R¹ | R² | R³ |
|---|---|---|---|
| 2-23 | —CH₃ | —C₆H₅ (phenyl) | —N(C₂H₅)₂ |
| 2-24 | —C₂H₅ | —CH₃ | —Cl |
| 2-25 | —C₂H₅ | —CH₃ | —OCH₃ |
| 2-26 | —C₂H₅ | —CH₃ | —NO₂ |
| 2-27 | —C₂H₅ | —CH₂—C₆H₅ | —Cl |
| 2-28 | —C₂H₅ | —CH₂—C₆H₅ | —OC₂H₅ |
| 2-29 | —C₂H₅ | —CH₂—C₆H₅ | —CH₃ |
| 2-30 | —C₂H₅ | —CH₂—C₆H₅ | —Br |
| 2-31 | —C₂H₅ | —CH₂—C₆H₅ | —N(C₂H₅)₂ |
| 2-32 | —C₂H₄OH | —CH₃ | —OC₂H₅ |
| 2-33 | —C₂H₄OH | —CH₃ | —C₂H₅ |
| 2-34 | —C₂H₄OH | —CH₃ | —N(C₂H₅)₂ |
| 2-35 | —C₂H₄OH | —C₂H₅ | —Br |
| 2-36 | —C₂H₄OH | —C₂H₅ | —NO₂ |
| 2-37 | —C₂H₄OH | —CH₂—C₆H₅ | —C₂H₅ |
| 2-38 | —C₂H₄OH | —CH₂—C₆H₅ | —OC₂H₅ |
| 2-39 | —C₂H₄OH | —CH₂—C₆H₅ | —N(C₂H₅)₂ |
| 2-40 | —C₂H₄OH | —C₆H₅ | —N(C₂H₅)₂ |
| 2-41 | —C₂H₄Cl | —CH₃ | —Cl |
| 2-42 | —C₂H₄Cl | —C₂H₅ | —Br |
| 2-43 | —C₂H₄Cl | —C₂H₅ | —NO₂ |
| 2-44 | —C₂H₄Cl | —CH₂—C₆H₅ | —N(C₂H₅)₂ |
| 2-45 | —C₂H₄Cl | —C₆H₅ | —OCH₃ |
| 2-46 | —C₂H₄Cl | —C₆H₅ | —N(CH₃)₂ |

TABLE 4

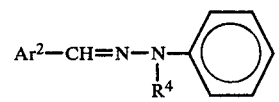

Ar²—CH=N—N(R⁴)(C₆H₅)

| compound No. | Ar² | R⁴ |
|---|---|---|
| 3-1 | naphthalen-1-yl | —CH₃ |
| 3-2 | naphthalen-2-yl | —CH₃ |
| 3-3 | 4-methoxynaphthalen-1-yl (H₃CO-naphthyl) | —CH₃ |
| 3-4 | 3-methoxynaphthalen-2-yl (OCH₃-naphthyl) | —CH₃ |
| 3-5 | anthracen-9-yl | —CH₃ |
| 3-6 | C₆H₅—CH=CH— | —CH₃ |
| 3-7 | (CH₃)₂N—C₆H₄—CH=CH— | —CH₃ |
| 3-8 | (3-methoxyphenyl)—CH=CH— | —CH₃ |

TABLE 4-continued

Ar²—CH=N—N(R⁴)—(phenyl)

| compound No. | Ar² | R⁴ |
|---|---|---|
| 3-9 | PhCH=C(CH₃)— | —CH₃ |
| 3-10 | 1-naphthyl | —CH₂Ph |
| 3-11 | 2-naphthyl | —CH₂Ph |
| 3-12 | 4-methoxy-1-naphthyl | —CH₂Ph |
| 3-13 | 2-methoxy-1-naphthyl | —CH₂Ph |
| 3-14 | 9-anthryl | —CH₂Ph |
| 3-15 | PhCH=CH— | —CH₂Ph |
| 3-16 | 4-(N,N-dimethylamino)phenyl-CH=CH— | —CH₂Ph |
| 3-17 | 2-methoxyphenyl-CH=CH— | —CH₂Ph |
| 3-18 | PhCH=C(CH₃)— | —CH₂Ph |
| 3-19 | 4-pyridyl | —CH₃ |
| 3-20 | 2-furyl | —CH₃ |
| 3-21 | 2-thienyl | —CH₃ |

TABLE 5

(R⁵,R⁶,R⁷,R⁸-substituted phenyl)—CH=N—N(R⁹)—(phenyl)

| Compound No. | R⁵ | R⁶ | R⁷ | R⁸ | R⁹ |
|---|---|---|---|---|---|
| 4-1 | —H | —H | —H | —H | —CH₃ |
| 4-2 | —H | —H | —CH₃ | —H | —CH₃ |
| 4-3 | —H | —H | —C₂H₅ | —H | —CH₃ |
| 4-4 | —CH₃ | —H | —CH₃ | —H | —CH₃ |
| 4-5 | —CH₃ | —H | —H | —CH₃ | —CH₃ |
| 4-6 | —H | —H | —OCH₃ | —H | —CH₃ |
| 4-7 | —H | —OCH₃ | —H | —H | —CH₃ |
| 4-8 | —OCH₃ | —H | —H | —H | —CH₃ |
| 4-9 | —OCH₃ | —OCH₃ | —H | —H | —CH₃ |
| 4-10 | —OCH₃ | —H | —OCH₃ | —H | —CH₃ |
| 4-11 | —OCH₃ | —H | —H | —OCH₃ | —CH₃ |
| 4-12 | —H | —OCH₃ | —OCH₃ | —H | —CH₃ |
| 4-13 | —H | —OCH₃ | —H | —OCH₃ | —CH₃ |
| 4-14 | —OCH₃ | —OCH₃ | —OCH₃ | —H | —CH₃ |
| 4-15 | —H | —OCH₃ | —OCH₃ | —OCH₃ | —CH₃ |
| 4-16 | —H | —H | —OC₂H₅ | —H | —CH₃ |
| 4-17 | —OC₂H₅ | —H | —H | —H | —CH₃ |
| 4-18 | —H | —OC₂H₅ | —OC₂H₅ | —H | —CH₃ |

TABLE 5-continued

Structure: R6, R5 on benzene ring with R7, R8; -CH=N-N(R9)-phenyl

| Compound No. | R⁵ | R⁶ | R⁷ | R⁸ | R⁹ |
|---|---|---|---|---|---|
| 4-19 | —H | —H | —N(CH₃)₂ | —H | —CH₃ |
| 4-20 | —H | —H | —N(C₂H₅)₂ | —H | —CH₃ |
| 4-21 | —H | —H | —N(CH₂C₆H₅)₂ | —H | —CH₃ |
| 4-22 | —H | —H | —H | —H | —CH₂—C₆H₅ |
| 4-23 | —H | —H | —CH₃ | —H | —CH₂—C₆H₅ |
| 4-24 | —H | —H | —C₂H₅ | —H | —CH₂—C₆H₅ |
| 4-25 | —CH₃ | —H | —CH₃ | —H | —CH₂—C₆H₅ |
| 4-26 | —CH₃ | —H | —H | —CH₃ | —CH₂—C₆H₅ |
| 4-27 | —H | —H | —OCH₃ | —H | —CH₂—C₆H₅ |
| 4-28 | —H | —OCH₃ | —H | —H | —CH₂—C₆H₅ |
| 4-29 | —OCH₃ | —H | —H | —H | —CH₂—C₆H₅ |
| 4-30 | —OCH₃ | —OCH₃ | —H | —H | —CH₂—C₆H₅ |
| 4-31 | —OCH₃ | —H | —OCH₃ | —H | —CH₂—C₆H₅ |
| 4-32 | —OCH₃ | —H | —H | —OCH₃ | —CH₂—C₆H₅ |
| 4-33 | —H | —OCH₃ | —OCH₃ | —H | —CH₂—C₆H₅ |
| 4-34 | —H | —OCH₃ | —H | —OCH₃ | —CH₂—C₆H₅ |

TABLE 5-continued

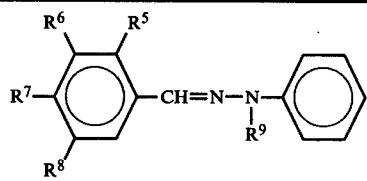

| Compound No. | R⁵ | R⁶ | R⁷ | R⁸ | R⁹ |
|---|---|---|---|---|---|
| 4-35 | —OCH₃ | —OCH₃ | —OCH₃ | —H | —CH₂—C₆H₅ |
| 4-36 | —H | —OCH₃ | —OCH₃ | —OCH₃ | —CH₂—C₆H₅ |
| 4-37 | —H | —H | —OC₂H₅ | —H | —CH₂—C₆H₅ |
| 4-38 | —OC₂H₅ | —H | —H | —H | —CH₂—C₆H₅ |
| 4-39 | —H | —OC₂H₅ | —OC₂H₅ | —H | —CH₂—C₆H₅ |
| 4-40 | —H | —H | —N(CH₃)₂ | —H | —CH₂—C₆H₅ |
| 4-41 | —H | —H | —N(C₂H₅)₂ | —H | —CH₂—C₆H₅ |
| 4-42 | —H | —H | —N(CH₂C₆H₅)₂ | —H | —CH₂—C₆H₅ |

TABLE 6

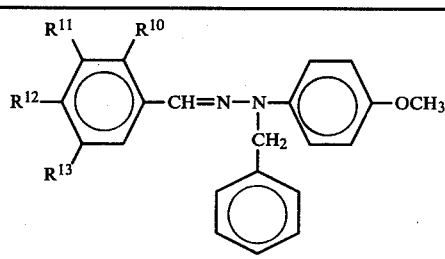
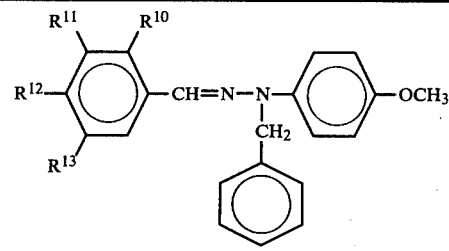

| Compound No. | R¹⁰ | R¹¹ | R¹² | R¹³ |
|---|---|---|---|---|
| 5-1 | —H | —H | —H | —H |
| 5-2 | —H | —H | —CH₃ | —H |
| 5-3 | —H | —CH₃ | —H | —H |
| 5-4 | —CH₃ | —H | —H | —H |
| 5-5 | —H | —H | —C₂H₅ | —H |
| 5-6 | —CH₃ | —H | —CH₃ | —H |
| 5-7 | —CH₃ | —H | —H | —CH₃ |
| 5-8 | —H | —H | —OCH₃ | —H |
| 5-9 | —H | —OCH₃ | —H | —H |
| 5-10 | —OCH₃ | —H | —H | —H |
| 5-11 | —OCH₃ | —OCH₃ | —H | —H |
| 5-12 | —OCH₃ | —H | —OCH₃ | —H |
| 5-13 | —OCH₃ | —H | —H | —OCH₃ |
| 5-14 | —H | —OCH₃ | —OCH₃ | —H |
| 5-15 | —H | —OCH₃ | —H | —OCH₃ |
| 5-16 | —OCH₃ | —OCH₃ | —OCH₃ | —H |
| 5-17 | —H | —OCH₃ | —OCH₃ | —OCH₃ |
| 5-18 | —H | —H | —OC₂H₅ | —H |
| 5-19 | —OC₂H₅ | —H | —H | —H |
| 5-20 | —H | —OC₂H₅ | —OC₂H₅ | —H |
| 5-21 | —H | —H | —N(CH₃)₂ | —H |

TABLE 6-continued

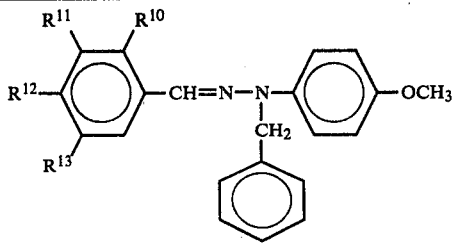

| Compound No. | R<sup>10</sup> | R<sup>11</sup> | R<sup>12</sup> | R<sup>13</sup> |
|---|---|---|---|---|
| 5-22 | —H | —H | —N(C$_2$H$_5$)$_2$ | —H |
| 5-23 | —CH$_3$ | —H | —N(C$_2$H$_5$)$_2$ | —H |
| 5-24 | —Cl | —H | —N(C$_2$H$_5$)$_2$ | —H |
| 5-25 | —H | —H | —N(C$_2$H$_5$)(C$_2$H$_4$Cl) | —H |
| 5-26 | —H | —H | —Cl | —H |
| 5-27 | —H | —Cl | —H | —H |
| 5-28 | —Cl | —H | —H | —H |
| 5-29 | —H | —H | —Br | —H |
| 5-30 | —H | —Br | —H | —H |
| 5-31 | —Br | —H | —H | —H |
| 5-32 | —H | —H | —N(CH$_2$C$_6$H$_5$)$_2$ | —H |

The drawing is an enlarged cross-sectional view of the electrophotographic element illustrating the embodiment of the present invention. This element is constructed so as to form a photosensitive layer 44 by providing a charge carrier generating layer 22 and a charge transfer layer 33 on an electrically conductive substrate 11.

The electrically conductive substrate used in the present invention includes a metal plate, metal drum or metal foil comprising aluminum, nickel, chromium or the like, a plastic film provided with a thin layer comprising aluminum, tin oxide, indium oxide, chrome, palladium or the like, paper or plastic film coated or impregnated with an electrically conductive substance and the like.

The charge carrier generating layer is formed by coating the electrically conductive substrate with a dispersion obtained by dispersing, in a suitable solvent, fine particles of the specific trisazo pigment having the previously indicated general formula (I) pulverized by means of a ball mill or the like, and if needed, the surface may be finished and the film thickness may be adjusted by buffing or the like.

The thickness of this charge carrier generating layer is 0.01 to 5 μm, preferably 0.05 to 2 μm, and the percentage of trisazo pigment in the charge carrier generating layer is 10 to 100% by weight, preferably 30 to 95% by weight. When the film thickness of the charge carrier generating layer is less than 0.01 μm, the sensitivity deteriorates, and when said film thickness is more than 5 μm, the potential retainability deteriorates. Further, when the percentage of trisazo pigment in the charge carrier generating layer is less than 10% by weight, the sensitivity deteriorates.

The charge transfer layer is formed by coating the surface of said charge carrier generating layer with a solution obtained by dissolving the previously stated hydrazone compound having the general formula (II) to (V) and a binder resin in a suitable solvent for instance such as tetrahydrofuran or the like. Hereat, the percentage of the hydrazone compound contained in the charge transfer layer is 10 to 80% by weight, preferably 25 to 75% by weight, and its film thickness is 2 to 100 μm, preferably 5 to 40 μm. When the percentage of the hydrazone compound contained in the charge transfer layer is less than 10% by weight, the sensitivity deteriorates, and when said percentage is more than 80% by weight, there are caused undesirable results such that the film becomes brittle and crystals separate so as to turn the charge transfer layer cloudy. When the thickness of the charge transfer layer is less than 5 μm, the potential retainability deteriorates, while when said thickness is more than 40 μm, the residual potential becomes high.

The binder resin for use in the charge carrier generating layer referred to herein includes polyester resin, butyral resin, ethyl cellulose resin, epoxy resin, acryl resin, vinylidene chloride resin, polystyrene resin, polybutadiene resin and their copolymers. They are used singly or in the mixed state of two kinds or more.

As the binder resin for use in the charge transfer layer there can be enumerated polycarbonate resin, polyester resin, polystyrene resin, polyurethane resin, epoxy resin, acryl resin, silicone resin and their copolymers. They are used singly or in the mixed state of two kinds or more.

Various kinds of additives may be incorporated in the charge transfer layer for the purpose of improving the flexibility or durability thereof. As the additives used for this purpose there can be enumerated halogenated paraffin, dialkyl phthalate, silicone oil and the like.

In the case of the element according to the present invention, if needed, there may be formed a barrier layer between the electrically conductive substrate and the charge carrier generating layer, an intermediate layer between the charge carrier generating layer and the charge transfer layer, and an overcoat layer on the charge transfer layer. Further, the charge carrier generating layer and the charge transfer layer may be layered in the built-up sequence contrary to that in the drawing, and it is possible to superimpose an overcoat layer on the charge carrier generating layer in this instance, too.

The constitution of the present invention is as described above. As is evident from the examples and comparative examples referred to hereinafter, the present invention relates to an electrophotographic element being exceedingly superior in that it is easy to prepare as compared with the electrophotographic element comprising the conventional layered structure, its characteristics are stable when used repeatedly and it is also highly sensitive to the wavelength range (about 800 nm) of the semi-conductor laser.

Next, the present invention will be explained more concretely with reference to examples, but the embodiments of the present invention should not be limited thereto alone.

DESCRIPTION OF THE PREFERRED EMBODIMENTS

Examples 1 to 102

1 part by weight of trisazo compound No. 1-4 according to the present invention, 19 parts by weight of tetrahydrofuran and 6 parts by weight of a 5% by weight tetrahydrofuran solution of polyvinyl butyral resin (XYHL; produced by Union.Carbide. Plastic Company) were fully pulverized by means of a ball mill. Next, this pulverized mixture was taken out and diluted with 104 parts by weight of tetrahydrofuran while stirring slowly. This solution was applied, with a wet gap of 35 μm, by means of a doctor blade and dried at 80° C. for 5 minutes, thereby forming a 0.8 μm-thick charge carrier generating layer. Then, a solution comprising 10 parts by weight of hydrazone compound No. 2-5, 10 parts by weight of polycarbonate resin (Panlite K-1300; produced by TEIJIN KASEI K. K.), 0.002 part by weight of silicone oil (KF-50; produced by Shinetsu Kagaku Kogyo K. K. ) and 80 parts by weight of tetrahydrofuran was applied on said charge carrier generating layer, with a wet gap of 200 μm, by means of a doctor blade, dried at 80° C. for 2 minutes, and then further dried at 100° C. for 5 minutes, thereby forming a 17 μm-thick charge transfer layer. The element No. 1 according to the present invention was thus prepared.

This element was subjected to 20 seconds' −6 or +6 corona discharge by means of an electrostatic copying paper tester (SP428 TYPE; produced by Kawaguchi Denki Seisakusho) and charged negatively or positively. Thereafter, the element was left standing for 20 seconds in the dark to measure the surface potential $V_{po}$ (V) at that time. Then, this element was exposed to radiation of light from a tungsten lamp so that the surface illuminance may be 20 lux to thereby measure the time (second) required until the surface potential is reduced into ½ of $V_{po}$ and calculate the exposure amount E½ (lux.second) therefrom.

Further, the following measurement was effected for the purpose of clarifying the long wavelength sensitivity.

First, the element was charged by corona discharge in the dark, and then was exposed to radiation of 1 $\mu W/cm^2$ of 800 nm-spectromonochromatic light to thereby measure the time (second) required until the surface potential decays into ½ (wherein, the dark-decayed portion of the surface potential has been compensated), measure the exposure amount ($\mu W.sec/cm^2$) and calculated the light decay speed ($volt.cm^2.\mu W^{-1}.sec^{-1}$) at 800 nm.

The thus obtained results are as shown in the following Table 7.

Further, Elements No. 2 to No. 102 were prepared according to the exactly same procedure as Element No. 1 except that the charge carrier generating layers and charge transfer layers were formed respectively by using trisazo compounds and hydrazone compounds as shown in Table 7. In succession, these elements were measured with reference to surface potential $V_{po}$, exposure amount E½ and light decay speed according to the same procedure as Element No. 1.

TABLE 7

| Example No. | Element No. | Trisazo compound No. | Film thickness of charge carrier generating layer (μm) | Hydrazone compound No. | Film thickness of charge transfer layer (μm) | Vpo (V) | E½ (lux · sec) | Light decay speed (Volt · $cm^2 \cdot \mu W^{-1} \cdot sec^{-1}$) |
| --- | --- | --- | --- | --- | --- | --- | --- | --- |
| 1 | 1 | 1-4 | 0.8 | 2-5 | 20 | −900 | 0.9 | 980 |
| 2 | 2 | 1-4 | 0.8 | 2-8 | 17 | −875 | 1.1 | 950 |
| 3 | 3 | 1-4 | 0.8 | 2-7 | 19 | −908 | 1.0 | 960 |
| 4 | 4 | 1-4 | 0.8 | 3-4 | 20 | −983 | 1.2 | 930 |
| 5 | 5 | 1-4 | 0.8 | 3-16 | 17 | −887 | 1.1 | 950 |
| 6 | 6 | 1-4 | 0.8 | 3-21 | 17 | −852 | 1.0 | 970 |
| 7 | 7 | 1-4 | 0.8 | 4-27 | 20 | −948 | 1.3 | 900 |
| 8 | 8 | 1-4 | 0.8 | 4-20 | 24 | −913 | 0.9 | 990 |
| 9 | 9 | 1-4 | 0.8 | 4-42 | 20 | −878 | 1.1 | 950 |
| 10 | 10 | 1-4 | 0.8 | 5-12 | 22 | −780 | 0.9 | 980 |
| 11 | 11 | 1-4 | 0.8 | 5-2 | 18 | −904 | 1.2 | 930 |
| 12 | 12 | 1-4 | 0.8 | 5-18 | 19 | −887 | 0.9 | 990 |
| 13 | 13 | 1-3 | 0.8 | 2-5 | 17 | −783 | 1.9 | 210 |
| 14 | 14 | 1-3 | 0.8 | 2-8 | 19 | −887 | 2.1 | 180 |
| 15 | 15 | 1-3 | 0.8 | 2-7 | 19 | −842 | 1.9 | 210 |
| 16 | 16 | 1-3 | 0.8 | 3-4 | 20 | −890 | 1.9 | 210 |
| 17 | 17 | 1-3 | 0.8 | 3-16 | 18 | −845 | 2.0 | 200 |
| 18 | 18 | 1-3 | 0.8 | 3-21 | 18 | −733 | 1.7 | 300 |
| 19 | 19 | 1-3 | 0.8 | 4-41 | 19 | −844 | 1.5 | 350 |
| 20 | 20 | 1-3 | 0.8 | 4-31 | 16 | −765 | 1.8 | 220 |
| 21 | 21 | 1-3 | 0.8 | 4-21 | 22 | −922 | 1.7 | 300 |
| 22 | 22 | 1-3 | 0.8 | 5-12 | 17 | −842 | 1.4 | 430 |
| 23 | 23 | 1-3 | 0.8 | 5-22 | 20 | −602 | 1.2 | 500 |
| 24 | 24 | 1-3 | 0.8 | 5-32 | 21 | −643 | 1.2 | 500 |
| 25 | 25 | 1-6 | 0.8 | 2-5 | 20 | −890 | 1.8 | 240 |
| 26 | 26 | 1-6 | 0.8 | 2-8 | 21 | −923 | 1.9 | 220 |
| 27 | 27 | 1-6 | 0.8 | 2-7 | 21 | −920 | 1.8 | 230 |
| 28 | 28 | 1-6 | 0.8 | 3-4 | 20 | −886 | 2.1 | 200 |
| 29 | 29 | 1-6 | 0.8 | 3-16 | 21 | −922 | 2.3 | 170 |
| 30 | 30 | 1-6 | 0.8 | 3-21 | 21 | −841 | 2.2 | 180 |
| 31 | 31 | 1-6 | 0.8 | 4-41 | 20 | −943 | 1.6 | 270 |
| 32 | 32 | 1-6 | 0.8 | 4-31 | 18 | −986 | 2.1 | 190 |
| 33 | 33 | 1-6 | 0.8 | 4-21 | 18 | −966 | 2.0 | 200 |
| 34 | 34 | 1-6 | 0.8 | 5-12 | 20 | −933 | 2.1 | 200 |
| 35 | 35 | 1-6 | 0.8 | 5-18 | 18 | −896 | 2.3 | 170 |
| 36 | 36 | 1-6 | 0.8 | 5-32 | 24 | −736 | 1.5 | 280 |

TABLE 7-continued

| Example No. | Element No. | Trisazo compound No. | Film thickness of charge carrier generating layer (μm) | Hydrazone compound No. | Film thickness of charge transfer layer (μm) | Vpo (V) | E½ (lux · sec) | Light decay speed (Volt · cm² · μW⁻¹ · sec⁻¹) |
|---|---|---|---|---|---|---|---|---|
| 37 | 37 | 1-2 | 0.8 | 2-5 | 20 | −946 | 1.8 | 200 |
| 38 | 38 | 1-2 | 0.8 | 2-8 | 20 | −910 | 1.9 | 170 |
| 39 | 39 | 1-2 | 0.8 | 2-7 | 19 | −922 | 1.9 | 170 |
| 40 | 40 | 1-2 | 0.8 | 3-4 | 20 | −833 | 2.5 | 150 |
| 41 | 41 | 1-2 | 0.8 | 3-16 | 21 | −895 | 2.6 | 140 |
| 42 | 42 | 1-2 | 0.8 | 3-21 | 17 | −740 | 2.0 | 160 |
| 43 | 43 | 1-2 | 0.8 | 4-41 | 17 | −861 | 2.1 | 160 |
| 44 | 44 | 1-2 | 0.8 | 4-31 | 17 | −923 | 2.6 | 140 |
| 45 | 45 | 1-2 | 0.8 | 4-21 | 15 | −837 | 1.9 | 170 |
| 46 | 46 | 1-2 | 0.8 | 5-12 | 20 | −866 | 1.7 | 210 |
| 47 | 47 | 1-2 | 0.8 | 5-18 | 18 | −911 | 2.5 | 150 |
| 48 | 48 | 1-2 | 0.8 | 5-32 | 23 | −510 | 1.9 | 160 |
| 49 | 49 | 1-1 | 0.8 | 4-41 | 20 | −985 | 2.5 | 140 |
| 50 | 50 | 1-1 | 0.8 | 4-31 | 16 | −826 | 3.5 | 90 |
| 51 | 51 | 1-1 | 0.8 | 4-21 | 18 | −941 | 3.3 | 100 |
| 52 | 52 | 1-1 | 0.8 | 5-12 | 19 | −863 | 2.4 | 150 |
| 53 | 53 | 1-1 | 0.8 | 5-18 | 21 | −935 | 3.6 | 70 |
| 54 | 54 | 1-1 | 0.8 | 5-32 | 25 | −617 | 2.2 | 140 |
| 55 | 55 | 1-5 | 0.8 | 2-5 | 19 | −721 | 2.5 | 120 |
| 56 | 56 | 1-5 | 0.8 | 2-8 | 19 | −730 | 2.6 | 110 |
| 57 | 57 | 1-5 | 0.8 | 2-7 | 20 | −811 | 2.4 | 140 |
| 58 | 58 | 1-5 | 0.8 | 4-41 | 19 | −875 | 1.8 | 170 |
| 59 | 59 | 1-5 | 0.8 | 4-31 | 18 | −1057 | 2.9 | 100 |
| 60 | 60 | 1-5 | 0.8 | 4-21 | 16 | −949 | 3.4 | 70 |
| 61 | 61 | 1-5 | 0.8 | 5-12 | 20 | −922 | 2.1 | 150 |
| 62 | 62 | 1-5 | 0.8 | 5-18 | 18 | −819 | 3.5 | 50 |
| 63 | 63 | 1-5 | 0.8 | 5-32 | 22 | −741 | 1.8 | 170 |
| 64 | 64 | 1-10 | 0.8 | 2-5 | 25 | −620 | 0.9 | 670 |
| 65 | 65 | 1-10 | 0.8 | 2-7 | 19 | −901 | 0.8 | 700 |
| 66 | 66 | 1-10 | 0.8 | 2-16 | 16 | −876 | 1.0 | 540 |
| 67 | 67 | 1-10 | 0.8 | 3-12 | 23 | −1040 | 1.5 | 240 |
| 68 | 68 | 1-10 | 0.8 | 3-5 | 19 | −932 | 2.0 | 150 |
| 69 | 69 | 1-10 | 0.8 | 3-21 | 18 | −909 | 1.0 | 450 |
| 70 | 70 | 1-10 | 0.8 | 4-31 | 20 | −1086 | 0.7 | 740 |
| 71 | 71 | 1-10 | 0.8 | 4-14 | 17 | −803 | 1.5 | 240 |
| 72 | 72 | 1-10 | 0.8 | 4-38 | 17 | −774 | 1.3 | 280 |
| 73 | 73 | 1-10 | 0.8 | 5-12 | 20 | −716 | 1.0 | 530 |
| 74 | 74 | 1-10 | 0.8 | 5-19 | 24 | −1160 | 1.1 | 380 |
| 75 | 75 | 1-10 | 0.8 | 5-5 | 16 | −703 | 1.3 | 280 |
| 76 | 76 | 1-7 | 0.8 | 2-5 | 16 | −811 | 2.1 | 140 |
| 77 | 77 | 1-7 | 0.8 | 2-22 | 20 | −743 | 1.5 | 240 |
| 78 | 78 | 1-7 | 0.8 | 2-40 | 22 | −855 | 1.5 | 240 |
| 79 | 79 | 1-7 | 0.8 | 4-21 | 24 | −956 | 0.7 | 730 |
| 80 | 80 | 1-7 | 0.8 | 4-31 | 16 | −879 | 1.5 | 240 |
| 81 | 81 | 1-7 | 0.8 | 4-41 | 22 | −903 | 0.8 | 700 |
| 82 | 82 | 1-7 | 0.8 | 5-12 | 20 | −791 | 2.5 | 130 |
| 83 | 83 | 1-7 | 0.8 | 5-23 | 24 | −755 | 1.2 | 340 |
| 84 | 84 | 1-7 | 0.8 | 5-32 | 24 | −770 | 1.3 | 270 |
| 85 | 85 | 1-9 | 0.8 | 2-5 | 14 | −619 | 2.5 | 130 |
| 86 | 86 | 1-9 | 0.8 | 2-28 | 18 | −844 | 1.9 | 170 |
| 87 | 87 | 1-9 | 0.8 | 2-23 | 22 | −779 | 1.2 | 340 |
| 88 | 88 | 1-9 | 0.8 | 4-21 | 18 | −655 | 1.1 | 320 |
| 89 | 89 | 1-9 | 0.8 | 4-31 | 18 | −734 | 1.5 | 240 |
| 90 | 90 | 1-9 | 0.8 | 4-41 | 25 | −810 | 1.3 | 270 |
| 91 | 91 | 1-9 | 0.8 | 5-12 | 20 | −986 | 2.5 | 130 |
| 92 | 92 | 1-9 | 0.8 | 5-23 | 20 | −860 | 1.9 | 170 |
| 93 | 93 | 1-9 | 0.8 | 5-32 | 18 | −789 | 1.5 | 240 |
| 94 | 94 | 1-8 | 0.8 | 2-5 | 19 | −698 | 2.5 | 130 |
| 95 | 95 | 1-8 | 0.8 | 2-28 | 20 | −877 | 2.0 | 150 |
| 96 | 96 | 1-8 | 0.8 | 2-23 | 21 | −780 | 1.4 | 260 |
| 97 | 97 | 1-8 | 0.8 | 4-21 | 21 | −874 | 1.6 | 220 |
| 98 | 98 | 1-8 | 0.8 | 4-31 | 16 | −855 | 2.5 | 130 |
| 99 | 99 | 1-8 | 0.8 | 4-41 | 20 | −866 | 1.9 | 170 |
| 100 | 100 | 1-8 | 0.8 | 5-12 | 20 | −966 | 2.5 | 130 |
| 101 | 101 | 1-8 | 0.8 | 5-23 | 18 | −786 | 1.4 | 260 |
| 102 | 102 | 1-8 | 0.8 | 5-32 | 22 | −1006 | 1.7 | 200 |

Example 103 to 136

Elements No. 103 to No. 136 were prepared by repeating the exactly same procedure as Example 1 except that the polyvinyl butyral resin was replaced by polyester resin (VYLON 200; produced by TOYO BOSEKI K. K.) and the trisazo compounds and hydrazone compounds shown in Table 8 were employed.

Then, these elements were measured with reference to surface potential $V_{po}$, exposure amount $E_{\frac{1}{2}}$ and light decay speed in accordance with the same procedure as Element No. 1

TABLE 8

| Example No. | Element No. | Trisazo compound No. | Film thickness of charge carrier generating layer (μm) | Hydrazone compound No. | Film thickness of charge transfer layer (μm) | Vpo (V) | E½ (lux · sec) | Light decay speed (Volt · cm² · μW⁻¹ · sec⁻¹) |
|---|---|---|---|---|---|---|---|---|
| 103 | 103 | 1-4 | 0.8 | 2-5 | 20 | −917 | 0.9 | 990 |
| 104 | 104 | 1-4 | 0.8 | 3-4 | 19 | −907 | 1.1 | 950 |
| 105 | 105 | 1-4 | 0.8 | 4-27 | 19 | −901 | 1.2 | 930 |
| 106 | 106 | 1-4 | 0.8 | 5-12 | 20 | −805 | 0.9 | 980 |
| 107 | 107 | 1-3 | 0.8 | 2-5 | 17 | −790 | 1.8 | 220 |
| 108 | 108 | 1-3 | 0.8 | 3-4 | 19 | −876 | 1.7 | 290 |
| 109 | 109 | 1-3 | 0.8 | 4-41 | 16 | −740 | 1.5 | 360 |
| 110 | 110 | 1-3 | 0.8 | 5-12 | 19 | −862 | 1.3 | 450 |
| 111 | 111 | 1-6 | 0.8 | 2-5 | 21 | −904 | 1.7 | 250 |
| 112 | 112 | 1-6 | 0.8 | 3-4 | 19 | −855 | 2.0 | 200 |
| 113 | 113 | 1-6 | 0.8 | 4-41 | 17 | −830 | 1.5 | 280 |
| 114 | 114 | 1-6 | 0.8 | 5-12 | 19 | −901 | 2.0 | 200 |
| 115 | 115 | 1-2 | 0.8 | 2-5 | 21 | −943 | 1.7 | 210 |
| 116 | 116 | 1-2 | 0.8 | 3-4 | 18 | −807 | 2.5 | 150 |
| 117 | 117 | 1-2 | 0.8 | 4-41 | 19 | −889 | 2.1 | 160 |
| 118 | 118 | 1-2 | 0.8 | 5-12 | 21 | −857 | 1.5 | 250 |
| 119 | 119 | 1-1 | 0.8 | 4-41 | 18 | −937 | 2.4 | 150 |
| 120 | 120 | 1-1 | 0.8 | 5-12 | 17 | −821 | 2.2 | 180 |
| 121 | 121 | 1-5 | 0.8 | 2-5 | 20 | −687 | 2.5 | 120 |
| 122 | 122 | 1-5 | 0.8 | 4-41 | 20 | −902 | 1.8 | 170 |
| 123 | 123 | 1-5 | 0.8 | 5-12 | 19 | −887 | 2.0 | 160 |
| 124 | 124 | 1-10 | 1.2 | 2-5 | 22 | −570 | 0.8 | 710 |
| 125 | 125 | 1-10 | 1.3 | 3-22 | 20 | −861 | 1.4 | 260 |
| 126 | 126 | 1-10 | 1.3 | 4-31 | 21 | −1066 | 0.7 | 740 |
| 127 | 127 | 1-10 | 1.2 | 5-12 | 22 | −791 | 1.0 | 500 |
| 128 | 128 | 1-7 | 1.3 | 2-5 | 18 | −839 | 2.0 | 150 |
| 129 | 129 | 1-7 | 1.4 | 4-21 | 18 | −653 | 0.6 | 810 |
| 130 | 130 | 1-7 | 1.2 | 5-12 | 16 | −604 | 2.6 | 110 |
| 131 | 131 | 1-9 | 1.1 | 2-5 | 17 | −923 | 2.5 | 130 |
| 132 | 132 | 1-9 | 1.3 | 4-21 | 20 | −617 | 1.1 | 320 |
| 133 | 133 | 1-9 | 1.2 | 5-12 | 19 | −904 | 2.4 | 140 |
| 134 | 134 | 1-8 | 1.2 | 2-5 | 18 | −633 | 2.4 | 140 |
| 135 | 135 | 1-8 | 1.3 | 4-21 | 24 | −925 | 1.4 | 260 |
| 136 | 136 | 1-8 | 1.2 | 5-12 | 17 | −743 | 2.4 | 140 |

COMPARATIVE EXAMPLE 1

A charge carrier generating layer was formed by using N,N'-dimethylperylene-3,4,9,10-tetracarboxylic acid diimide as a charge carrier generating substance and vacuum vapor-depositing it on an aluminum plate under the conditions: degree of vacuum $10^{-5}$ mmHg, vapordeposition source temperature 350° C., and vapor-depositing time 3 minutes. Then, a solution comprising 5 parts by weight of 2,5-bis(4-diethylaminophenyl)-1,3,4-oxadiazole, 5 parts by weight of polyester resin (Polyester adhesive 49000; produced by Du Pont) and 90 parts by weight of tetrahydrofuran was applied on this charge carrier generating layer, and dried at 120° C. for 10 minutes, thereby forming a charge transfer layer having a thickness of about 10 μm. Control element No. 1 was thus prepared.

COMPARATIVE EXAMPLE 2

A solution was obtained by using, as a charge carrier generating substance, chloro-dian blue, classified as a benzidine-type pigment, and dissolving 1.08 parts by weight thereof in 24.46 parts by weight of ethylene diamine. 20.08 parts by weight of n-butylamine were added to the resulting solution with stirring, and further 54.36 parts by weight of tetrahydrofuran were added thereto, whereby a charge carrier generating layer-coating solution was prepared. Then, this coating solution was coated on an aluminum-vapordeposited polyester film by means of a doctor blade, and dried at 80° C. for 5 minutes to thereby form a charge carrier generating layer having a thickness of about 0.5 μm. Then, a solution comprising 1 part by weight of 1-phenyl-3-(4-diethylaminostyryl)-5-(4-diethylaminophenyl)-pyrazoline, 1 part by weight of polycarbonate resin (Panlite K-1300; produced by TEIJIN KASEI K. K.) and 8 parts by weight of tetrahydrofuran was applied on said charge carrier generating layer by means of a doctor blade, dried at 80° C. for 2 minutes, and then dried at 100° C. for 5 minutes, thereby forming a charge transfer layer having a thickness of about 20 μm. Control element No. 2 was thus prepared.

COMPARATIVE EXAMPLE 3

A dispersion was obtained by using, as a charge carrier generating substance, 4,4',4''-tris[2-hydroxy-3-(2-methoxyphenylcarbamoyl)-1-naphthylazo]triphenylamine, classified as a triphenylamine-type pigment, and pulverizing and mixing 2 parts by weight thereof together with 98 parts by weight of tetrahydrofuran in a ball mill. This dispersion was applied on an aluminum-vapordeposited polyester film by means of a doctor blade, and air-dried to thereby form a charge carrier generating layer having a thickness of 1 μm. On the other hand, a solution was obtained by mixing 2 parts by weight of 2,5-bis(4-diethylaminophenyl)-1,3,4-oxadiazole, 2 parts by weight of polycarbonate resin (Panlite L; produced by TEIJIN KASEI K. K.) and 46 parts by weight of tetrahydrofuran. This solution was applied on said charge carrier generating layer by means of a doctor blade, and dried at 120° C. for 10 minutes, thereby forming a charge transfer layer having a thickness of 10 μm. Control element No. 3 was thus prepared.

COMPARATIVE EXAMPLE 4

1 part by weight of polyester resin (Polyester Adhesive 49000; produced by Du Pont), 1 part by weight of 4,4',4''-tris[2-hydroxy-3-(2,5-dimethoxyphenylcarbamoyl)-1-naphthylazo]triphenylamine classified as a triphenylamine-type pigment and 26 parts by weight of tetrahydrofuran were pulverized and mixed in a ball mill to thereby obtain a dispersion. The thus obtained dispersion was applied on an aluminum-vapordeposited polyester film by means of a doctor blade, and dried at 100° C. for 10 minutes, whereby Control element No. 4 comprising a 7 μm-thick photosensitive layer was prepared.

COMPARATIVE EXAMPLE 5

10 parts by weight of polyester resin (the same as Comparative Example 4), 10 parts by weight of 2,4,7-trinitro-9-fluorenone, 2 parts by weight of the trisazo compound (disclosed in Japanese Laid Open Patent Application 132347/1978) wherein the substituent attaching to each terminal CONH— in the general formula (I) is a 2-methyl-4-methoxyphenyl group, and 198 parts by weight of tetrahydrofuran were pulverized and mixed in a ball mill to thereby obtain a dispersion. The thus obtained dispersion was applied on an aluminum-vapordeposited polyester film by means of a doctor blade, and dried at 100° C. for 10 minutes, whereby Control element No. 5 comprising a 10 μm-thick photosensitive layer was prepared.

The thus obtained Control elements No. 1 to No. 5 were measured with reference to surface potential $V_{po}$, exposure amount $E_{\frac{1}{2}}$ and light decay speed according to the same procedure as Element No. 1 of the present invention. The obtained results are as shown in Table 9.

TABLE 9

| Control element No. | $V_{po}$ (volt) | $E_{\frac{1}{2}}$ (lux · sec) | Light decay speed at 800 nm (volt · cm$^2$ · μW$^{-1}$ · sec$^{-1}$) |
|---|---|---|---|
| No. 1 | −960 | 5.4 | 10 or less |
| No. 2 | −603 | 1.9 | 10 or less |
| No. 3 | −980 | 8.3 | 10 or less |
| No. 4 | +480 | 5.4 | 10 or less |
| No. 5 | −650 | 27.4 | 10 or less |

It can be clearly observed from the above results that the laminate-type element according to the present invention is highly sensitive to the visible region as compared with Control elements Nos. 1 to 5 and exhibits an exceedingly superior sensitivity to the wavelength region (800 nm) of semiconductor laser. Further, the element according to the present invention is more profitable in the preparation because it dispenses with the necessity of using the organic amine employed in the preparation of Control element No. 2.

Still further, Elements No. 1 to No. 136 according to the present invention were respectively set in a copying machine FT-4700 produced by RICOH COMPANY, LTD., so as to repeat the image developing operation 10,000 times. Consequently, it was found that the respective elements could produce clear-cut images without fail.

It will be understandable therefrom that elements of the present invention are exceedingly superior in durability.

What is claimed is:

1. An electrophotographic element comprising an electrically conductive substrate, a charge carrier generating layer and a charge transfer layer superimposed on said substrate, wherein said charge carrier generating layer contains a trisazo compound having the general formula (I):

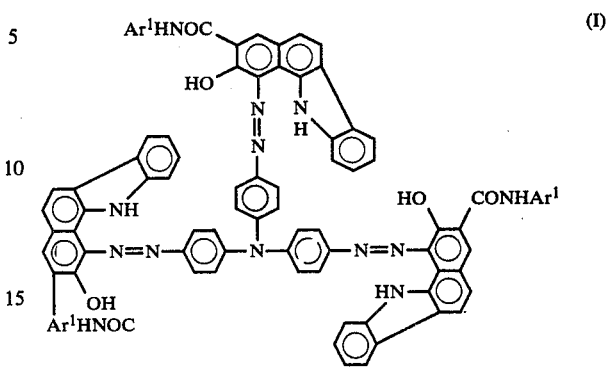

wherein, Ar$^1$ represents

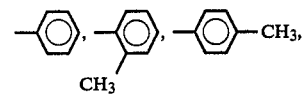

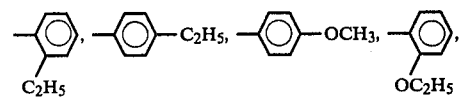

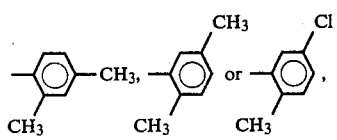

and said charge transfer layer contains a hydrazone compound having the general formula (II), (III), (IV) or (V):

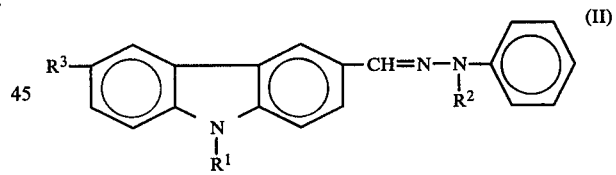

wherein, R$^1$ represents a methyl group, an ethyl group, a 2-hydroxyethyl group or a 2-chloroethyl group, R$^2$ represents a methyl group, an ethyl group, a benzyl group or a phenyl group, and R$^3$ represents hydrogen, chlorine, bromine, an alkyl group having 1 to 4 carbon atoms, an alkoxy group having 1 to 4 carbon atoms, a dialkylamino group or a nitro group,

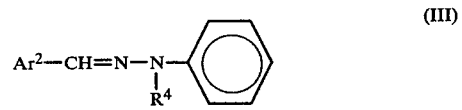

wherein Ar$^2$ represents a naphthalene ring, a substituted napthalene ring, an anthracene ring, a substituted anthracene ring, a styryl group, a substituted styryl group, a pyridine ring, a furan ring or a thiophene ring, and R$^4$ represents an alkyl group or a benzyl group,

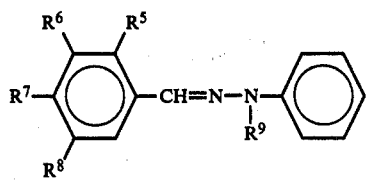 (IV)

wherein, $R^5$, $R^6$, $R^7$ and $R^8$ each represents hydrogen, an alkyl group having 1 to 3 carbon atoms, an alkoxy group having 1 to 3 carbon atoms, a dialkylamino group or a dibenzylamino group, and $R^9$ represents an alkyl group or a benzyl group,

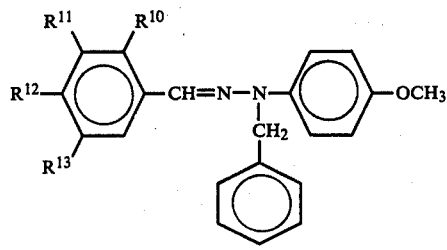 (V)

wherein, $R^{10}$, $R^{11}$, $R^{12}$, and $R^{13}$ each represents hydrogen, an alkyl group having 1 to 3 carbon atoms, an alkoxy group having 1 to 3 carbon atoms, a substituted or non-substituted dialkylamino group, a dibenzylamino group or a halogen atom, and a binder.

2. An electrophotographic element as claimed in claim 1 wherein the charge carrier generating layer is interposed between the charge transfer layer and the electrically conductive substrate, and the charge transfer layer forms an exposed surface.

3. An electrophotographic element as claimed in claim 1 wherein the charge carrier generating layer is 0.01 to 5 μm thick, and the charge transfer layer is 2 to 100 μm thick.

4. An electrophotographic element as claimed in claim 1 wherein the charge carrier generating layer contains the trisazo compound in a quantity of 10 to 100% by weight, and the charge transfer layer contains the hydrazone compound in a quantity of 10 to 80% by weight.

5. An electrophotographic element as claimed in claim 4 wherein the charge carrier generating layer contains at least one kind of binder selected from the group consisting of polyester resin, butyral resin, ethyl cellulose resin, epoxy resin, acryl resin, vinylidene chloride resin, polystyrene resin, polybutadiene resin and their copolymers.

6. An electrophotographic element as claimed in claim 1 containing in the charge carrier generating layer the trisazo compound wherein said $Ar^1$ represents

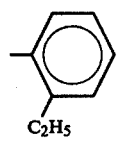

7. An electrophotographic element as claimed in claim 1 containing in the charge carrier generating layer the trisazo compound wherein $Ar^1$ represents

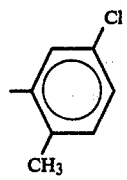

8. An electrophotographic element as claimed in claim 1 containing in the charge carrier generating layer the trisazo compound wherein $Ar^1$ represents

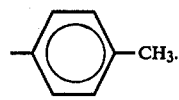

9. An electrophotographic element as claimed in claim 1 containing in the charge carrier generating layer the trisazo compound wherein $Ar^1$ represents

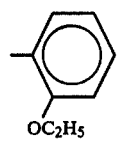

10. An electrophotographic element as claimed in claim 1 containing in the charge carrier generating layer the trisazo compound wherein $Ar^1$ represents

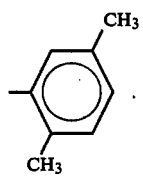

11. An electrophotographic element as claimed in claim 1, 6, 7, 8, 9 or 10 containing in the charge transfer layer the hydrazone compound having the general formula (II):

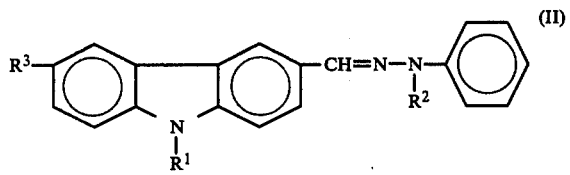 (II)

wherein, $R^1$ represents a methyl group, an ethyl group, a 2-hydroxyethyl group or a 2-chloroethyl group, $R^2$ represents a methyl group, an ethyl group, a benzyl group or a phenyl group, and $R^3$ represents hydrogen, chlorine, bromine, an alkyl group having 1 to 4 carbon atoms, an alkoxy group having 1 to 4 carbon atoms, a dialkylamino group or a nitro group.

12. An electrophotographic element as claimed in claim 1, 6, 7 or 8 containing in the charge transfer layer the hydrazone compound having the general formula (III):

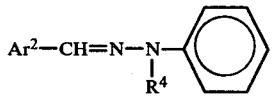
(III)

wherein, Ar² represents a naphthalene ring, a substituted napthalene ring, an anthracene ring, a substituted anthracene ring, a styryl group, a substituted styryl group, a pyridine ring, a furan ring or a thiophene ring, and R⁴ represents an alkyl group or a benzyl group.

13. An electrophotographic element as claimed in claim 1, 6, 7, 8, 9 or 10 containing in the charge transfer layer the hydrazone compound having the general formula (IV):

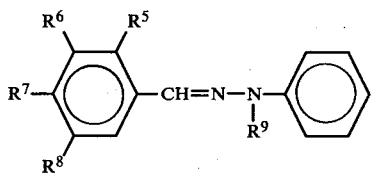
(IV)

wherein, R⁵, R⁶, R⁷ and R⁸ each represents hydrogen, an alkyl group having 1 to 3 carbon atoms, an alkoxy group having 1 to 3 carbon atoms, a dialkylamine group or a dibenzylamino group, and R⁹ represents an alkyl group or a benzyl group.

14. An electrophotographic element as claimed in claim 1, 6, 7, 8, 9 or 10 containing in the charge transfer layer the hydrazone compound having the general formula (V):

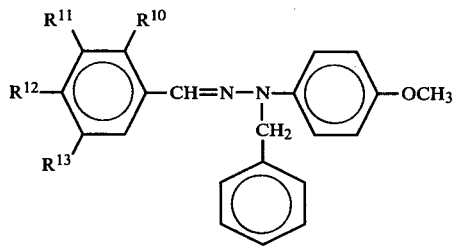
(V)

wherein, R¹⁰, R¹¹, R¹² and R¹³ each represents hydrogen, an alkyl group having 1 to 3 carbon atoms, an alkoxy group having 1 to 3 carbon atoms, a substituted or non-substituted dialkylamino group, a dibenzylamino group or a halogen atom.

15. An electrophotographic element as claimed in claim 6 wherein the charge transfer layer contains one hydrazone compound selected from the group consisting of:

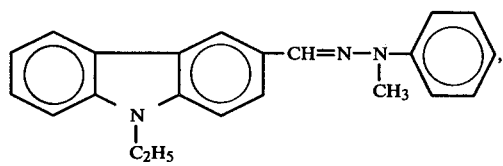

-continued

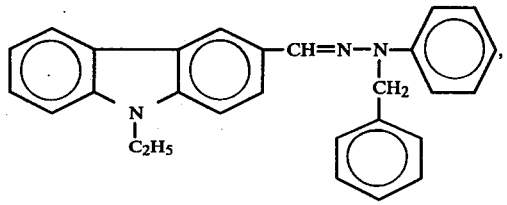

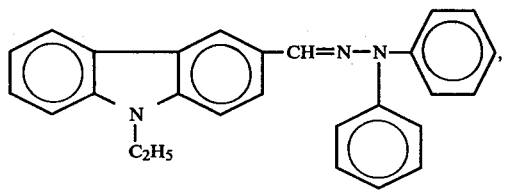

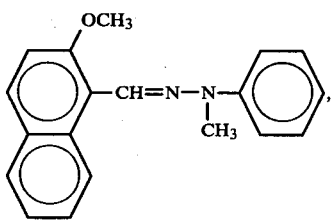

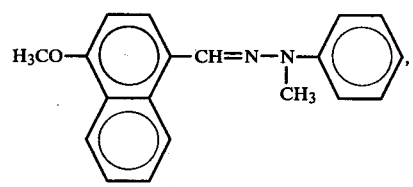

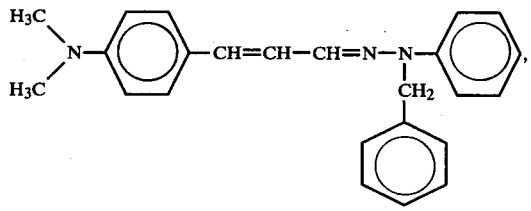

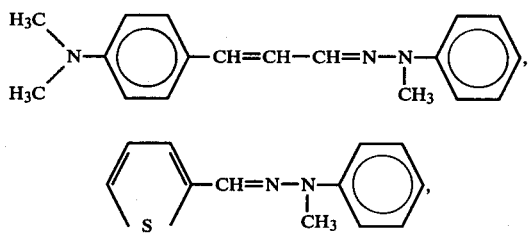

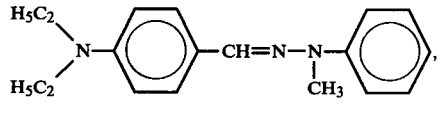

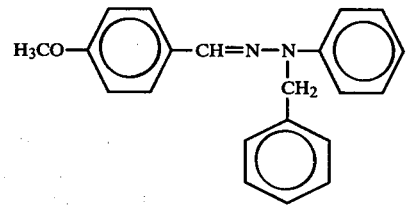

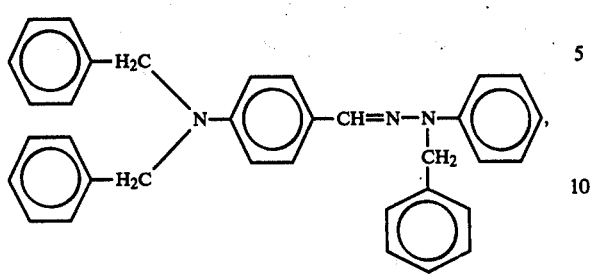
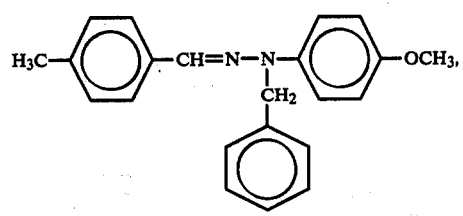
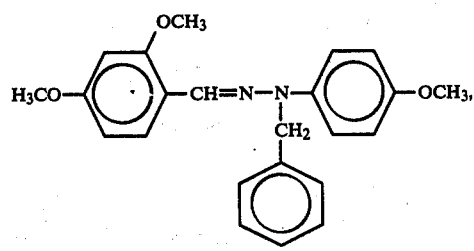
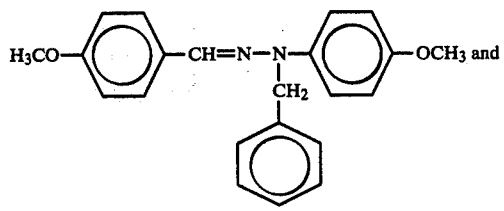
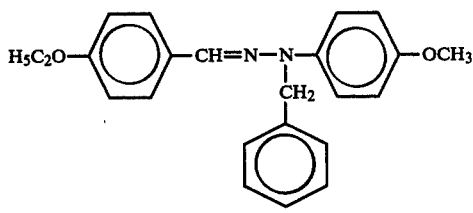
16. An electrophotographic element as claimed in claim 8 wherein the charge transfer layer contains one hydrazone compound selected from the group consisting of:
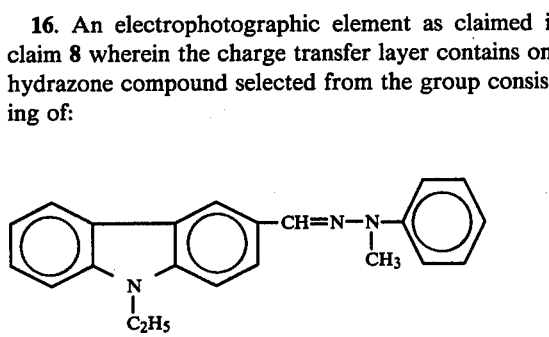
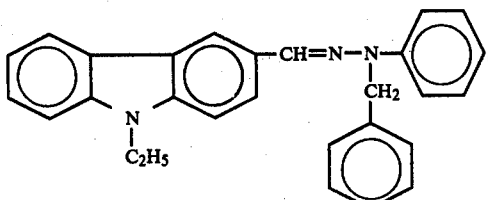
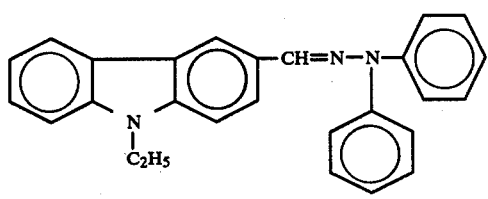
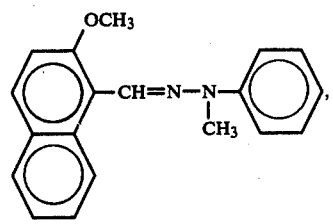
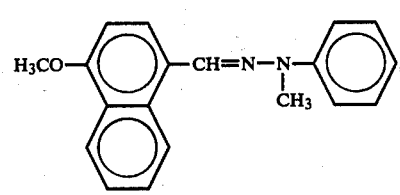
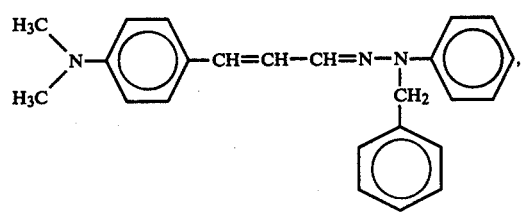
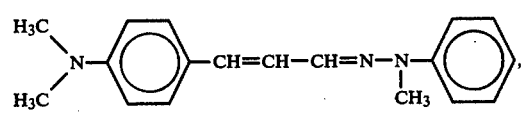
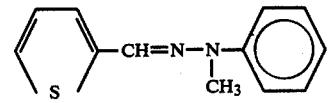
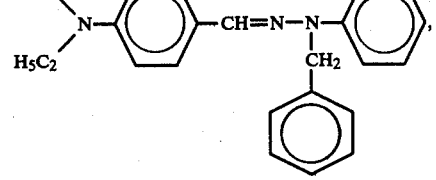

-continued
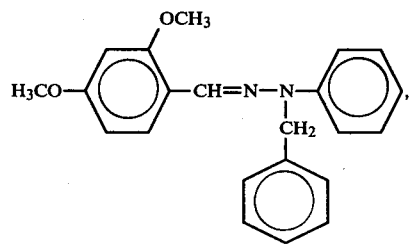
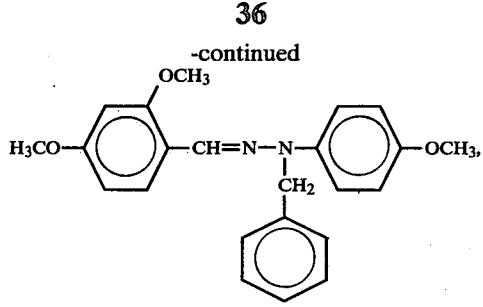
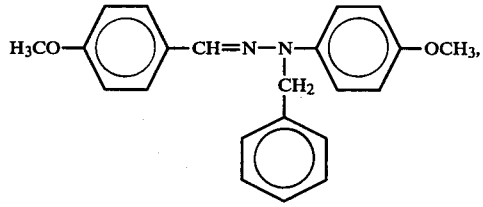
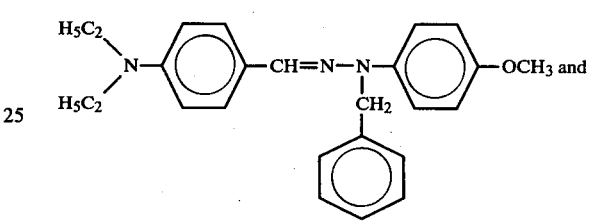
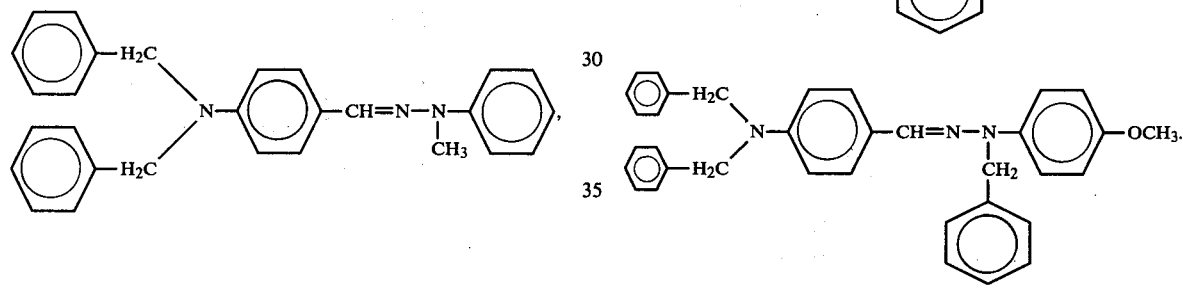
* * * * *